United States Patent
Peng et al.

(10) Patent No.: US 12,122,485 B1
(45) Date of Patent: Oct. 22, 2024

(54) WATER FLOW MEASURING DRIFTING BUOY CAPABLE OF PREVENTING STRANDING AND RESISTING IMPACT

(71) Applicant: CHINA INSTITUTE OF WATER RESOURCES AND HYDROPOWER RESEARCH, Beijing (CN)

(72) Inventors: Wenqi Peng, Beijing (CN); Yongsheng Zhang, Beijing (CN); Xiaobo Liu, Beijing (CN); Fei Dong, Beijing (CN); Weijie Wang, Beijing (CN); Xuekai Chen, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 18/386,262

(22) Filed: Nov. 2, 2023

(30) Foreign Application Priority Data

Oct. 11, 2023 (CN) .......................... 202311315701.X

(51) Int. Cl.
　　*B63B 22/00* (2006.01)
　　*B63B 79/15* (2020.01)
　　*G01C 13/00* (2006.01)
(52) U.S. Cl.
　　CPC .............. *B63B 22/00* (2013.01); *B63B 79/15* (2020.01); *G01C 13/006* (2013.01)
(58) Field of Classification Search
　　CPC .. G01C 13/004; G01C 13/006; G01C 13/002; G01C 13/00; G01C 13/008; G01C 5/06;
(Continued)

(56) References Cited

U.S. PATENT DOCUMENTS 4,998,900 A　　3/1991　Wright

FOREIGN PATENT DOCUMENTS

CN　　1673031 A　　9/2005
CN　　1723063 A　　1/2006
(Continued)

OTHER PUBLICATIONS

Search Report of CN202311315701X, Jan. 19, 2024.

*Primary Examiner* — Andre J Allen
(74) *Attorney, Agent, or Firm* — J.C. PATENTS

(57) ABSTRACT

The present invention relates to a water flow measuring drifting buoy capable of preventing stranding and resisting impact, which includes: a ball-game table-shaped inflation body with a counterweight capable of drifting autonomously in a direction of a main stream of a water flow, wherein the inflation body is provided with at least two inflation connectors, and the inflation connectors are of a cross-shaped structure formed by connecting in a conical distribution with 4 inflation-stabilizing rods uniformly distributed along a circumferential radiation; the counterweight is 4-10 fan-shaped steel plates arranged annularly in the center of the bottom of the inflation body, and the fan-shaped steel plates are flexibly connected to each other to be able to shake. The ball-game table structure used in the present invention is selected by comparing various shapes to push a buoy to the middle of a river where the water flow is turbulent by using the difference in a water flow speed to prevent the water flow from being stranded where the water flow is slow or being blocked by a rock at a river bank so as not to continue the drift. The steel plate of the cross-shaped structure in the fan-shaped distribution is used, so that the buoy can be turned up and continue to drift once it has fallen to the ground, greatly improving the efficiency of drift.

6 Claims, 3 Drawing Sheets

(58) Field of Classification Search
CPC ........ G01C 9/18; G01C 17/34; G01C 21/185;
G01C 21/203; G01C 25/00; G01C 5/04;
G01C 9/00; G01C 9/06; G01C 9/12;
G01C 9/14; B63B 22/18; B63B 2211/02;
B63B 22/24; B63B 22/003; B63B
2022/006; B63B 21/66; B63B 22/04;
B63B 2021/005; B63B 22/20; B63B
59/04; B63B 21/20; B63B 22/00; B63B
22/02; B63B 2209/14; B63B 39/14; B63B
51/04; B63B 79/15; B63B 2027/165;
B63B 2035/008; B63B 21/24; B63B
21/29; B63B 21/56; B63B 22/08; B63B
22/16; B63B 2201/00; B63B 2201/16;
B63B 2205/00; B63B 2207/00; B63B
2211/00; B63B 2211/06; B63B 27/36;
B63B 3/04; B63B 35/00; B63B 35/40;
B63B 35/42; B63B 7/00; B63B 71/10;
B63B 79/40

USPC .......................................... 73/170.29–170.33
See application file for complete search history.

(56) References Cited

FOREIGN PATENT DOCUMENTS

| CN | 105129028 | A |   | 12/2015 |
| CN | 204956858 | U |   | 1/2016 |
| CN | 115755685 | A | * | 3/2023 |
| CN | 218703747 | U |   | 3/2023 |
| CN | 218986888 | U |   | 5/2023 |
| CN | 116495111 | A |   | 7/2023 |
| CN | 116552707 | A | * | 8/2023 |
| CN | 116654175 | A | * | 8/2023 |
| CN | 117262119 | A | * | 12/2023 |
| KR | 20020065988 | A |   | 8/2002 |
| KR | 101687274 | B1 |   | 12/2016 |
| KR | 102448527 | B1 |   | 9/2022 |

* cited by examiner

WATER FLOW MEASURING DRIFTING BUOY CAPABLE OF PREVENTING STRANDING AND RESISTING IMPACT

CROSS-REFERENCE TO RELATED APPLICATION

This application claims the priority benefit of China application serial no. 202311315701.X, filed on Oct. 11, 2023. The entirety of the above-mentioned patent application is hereby incorporated by reference herein and made a part of this specification.

TECHNICAL FIELD

The present invention relates to a water flow measuring drifting buoy capable of preventing stranding and resisting impact, which, as a hydrological detection facility, is an apparatus for detecting and measuring a flow pattern of a river and lake flow.

BACKGROUND ART

A buoy which flows freely with the flow is generally used for detection and measurement of the flow law of rivers and lakes. Conventional buoys are generally cylindrical, or other geometric shapes are essentially randomly designed without serious consideration. Such a conventional buoy is very easy to be stranded or stagnated in the river rocks or debris during the drift process, so that the drift cannot be continued, thus losing the function of measurement, which must rely on manual salvage and re-put into the river to continue use. There is often that phenomenon that seriously affects the measurement process and wastes a lot of manpower and material resources to salvage the measuring buoy. In addition, fishing is more difficult or even impossible if the drifting measurement is around an unfrequented wild river bank. In addition, the conventional drifting buoy has a hard structure, and it is not too difficult to perform the drifting measurement in a relatively smooth water flow, but would be difficult for the existing measuring buoy to perform the drifting measurement in a river where the water flow is turbulent. A rapid flow of water and its reefs produce a large impact on a hard hull of the rapid flow buoy and cause damage, even without damage, the resulting hardness-bumping-hardness impact also impacts the electronics within the buoy and increases a failure rate. If only the material of the hard hull is improved, the material with higher strength and hardness will certainly increase the cost of the material, and the effect is not satisfactory in practice. It is a problem to be solved how to enable a buoy to stably drift in a main stream and have a strong impact resistance to be able to prevent stranding and stagnation.

SUMMARY OF THE INVENTION

In order to overcome the problems of the prior art, the present invention provides a water flow measuring drifting buoy capable of preventing stranding and resisting impact. A submerged portion of the buoy is in the form of a ball-game table body. The present invention utilizes a Bernoulli principle of fluid mechanics: a principle of producing a lateral thrust by an object in a fluid due to differences in flow velocities on either side, wherein an appropriate shape is chosen so that the buoy always remains in the main stream during drift, thereby avoiding stranding or stagnation of the buoy. Through the drifting experiment and computer simulation of objects with various shapes, it is determined that a ball shape is the most favorable geometry to realize this principle, and the ball-game table with a hole in the center is finally selected as a shape of the submerged buoy through screening. At the same time, the present invention achieves a good impact resistance and anti-stranding effect at an extremely low cost by using a roly-poly principle, a flexible inflation anti-stranding member for the main body, and a counterweight steel plate capable of swinging against a water current impact.

An object of the present invention is achieved in that a water flow measuring drifting buoy capable of preventing stranding and resisting impact, which includes: a ball-game table-shaped inflation body with a counterweight capable of drifting autonomously in a direction of a main stream of a water flow, wherein the inflation body is provided with at least two inflation connectors, and the inflation connectors are of a cross-shaped structure formed by connecting in a conical distribution with 3-6 inflation-stabilizing rods uniformly distributed along a circumferential radiation, and an envelope diameter of an outer edge of the inflation-stabilizing rods is greater than or equal to a rotating diameter of the inflation body; the counterweight is 4-10 fan-shaped steel plates arranged annularly in the center of the bottom of the inflation body, and the fan-shaped steel plates are flexibly connected to each other to be able to shake.

Further, the ball-game table has a diameter of 0.5 to 1.8 m.

Further, the weight maintains a portion of the inflation body invaded into the water while floating at ¼ to ⅓ of the inflation body.

Further, the inflation body, the inflation connector and the inflation-stabilizing rods are of a double-layer structure.

Further, the inflation body, the inflation connector and the inflation-stabilizing rods are provided with an inflation compartment.

Further, the ball-game table-shaped inflation body is a ball-game table of ⅛ to ⅕ balls.

Further, the inflation body is provided with an equipment compartment formed of a hard material in the center thereof.

Further, the equipment compartment is spherical.

Further, a satellite positioning module, a radio communication module and a power supply module are provided in the equipment compartment.

The advantages and benefits of the present invention are: the present invention employs a ball-game table-shaped body with a counterweight at the bottom that most easily drifts along the main stream, and provides a conical inflation connector that prevents stranding and inflation-stabilizing rods for radiation distribution. The conical inflation connector and the inflation-stabilizing rods are provided to reduce tipping and rolling of the buoy and improves the resistance to standing. At the same time, the inflation structure can prevent the buoy from being caught by aquatic plants and being unable to float downstream under certain volume requirements. The inflation structure can not only effectively reduce a failure caused by the impact on the equipment compartment, but also make use of the roly-poly principle to keep the communication antenna exposed above the water surface, and has low material and manufacturing costs.

Therefore, the inflation structure of the present invention perfectly solves the problems of impact resistance, stranding resistance, and stagnation under the premise of reducing the costs, so that the buoy can stably work and drift in the unfrequented environment, greatly saves the measurement costs, and essentially realizes automatic observation without personnel supervision.

BRIEF DESCRIPTION OF THE DRAWINGS

The present invention is further illustrated by the following figures and examples.

DETAILED DESCRIPTION OF THE INVENTION

Embodiment 1

Figure 1:
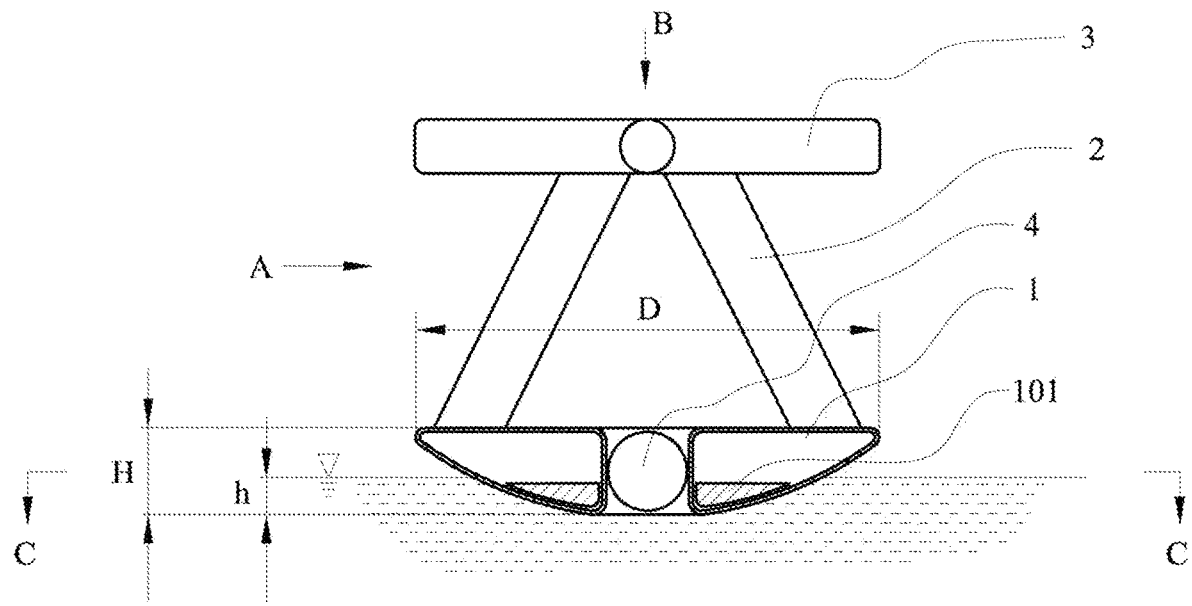
FIG. 1 is a schematic diagram showing a buoy according to an embodiment of the present invention.
Figure 2:
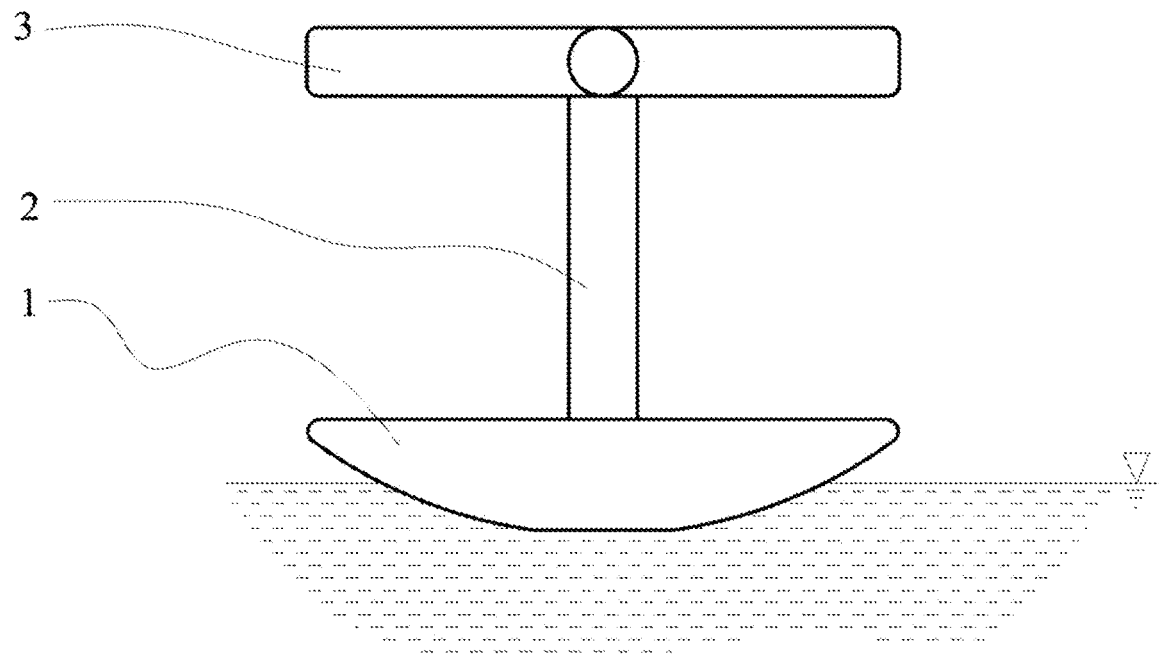
FIG. 2 is a structural schematic diagram showing a buoy according to an embodiment of the present invention, which is an A-direction view in FIG. 1.
Figure 3:
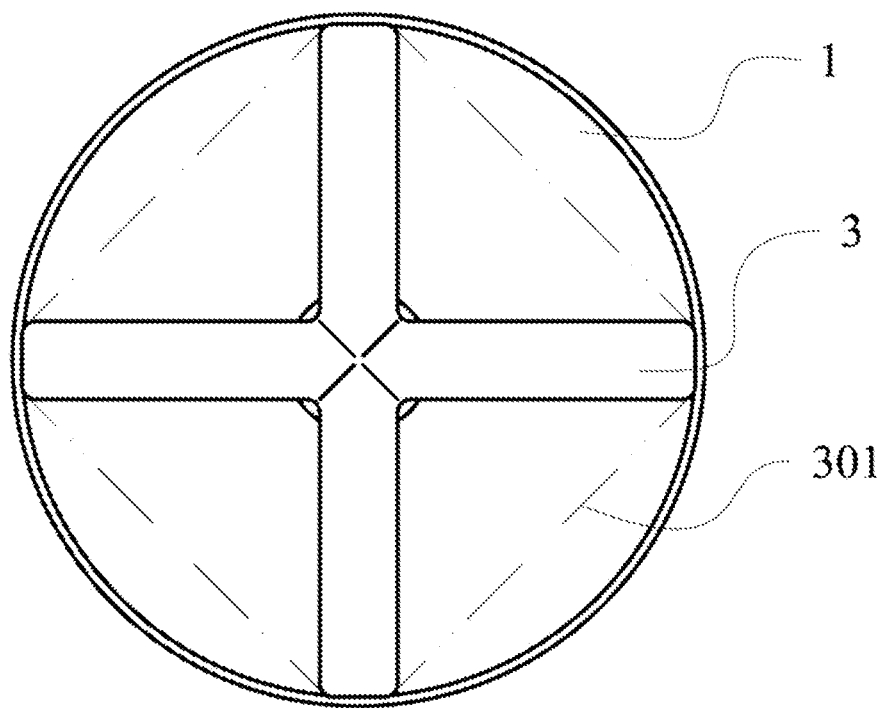
FIG. 3 is a structural schematic diagram showing a buoy according to an embodiment of the present invention, which is a B-direction view in FIG. 1.
Figure 4:
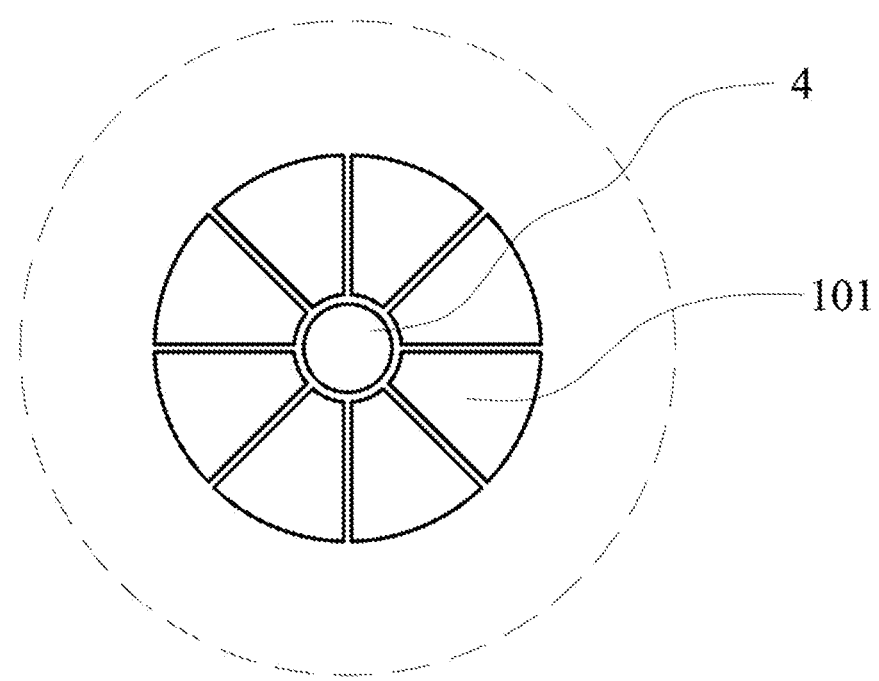
FIG. 4 is a diagram showing a counter weight of a buoy according to an embodiment of the present invention, which is a cross-sectional view C-C in FIG. 1.

This embodiment is a water flow measuring drifting buoy capable of preventing stranding and resisting impact, as shown in FIGS. 1, 2, 3 and 4. This embodiment comprises: a ball-game table-shaped inflation body 1 with a counterweight 101 capable of drifting autonomously in a direction of a main stream of a water flow, wherein at least two inflation connectors 2 are of a cross-shaped structure formed by connecting in a conical distribution with 3-6 inflation-stabilizing rods 3 uniformly distributed along a circumferential radiation, and the diameter of the envelope 301 (the double-dot chain line in FIG. 3 represents the envelope) at an outer edge of the inflation-stabilizing rods is greater than or equal to a rotating diameter of the inflation body; the counterweight is 4-10 fan-shaped steel plates arranged annularly in the center of the bottom of the inflation body, and the fan-shaped steel plates are flexibly connected to each other to be able to shake, as shown in FIG. 4.

The existing measuring buoys are designed mainly for manufacturing convenience and cost reduction, and cylindrical hard materials are generally uses, such as steel cylinders. In addition to being prone to damage due to collision during drifting, such shapes are often stranded or tipped over gravel beaches. To this end, the shape of the drifting buoy is carefully studied to find the optimum shape.

Firstly, it is considered that the buoy should float in a main stream of the water flow as much as possible, because the main stream of the water flow generally has a larger flow velocity and a deeper water depth, the water channel is usually wider, and the buoy is not easy to be stranded in the main stream of the water flow and easy to pass through. Secondly, the shape of the submerged buoy is sought and should make the buoy easy to float into the main stream of the water flow. Thirdly, the shape of the buoy upper layer (above the water surface) is chosen, so that the buoy is not prone to tipping over, after which the buoy will be able to turn up autonomously to continue the drift, while the buoy upper layer should also have the ability to resist various collisions and impacts in the drift.

The shape of the submerged buoy is first studied, and various shapes are studied, including: water flow experiments and computer simulation experiments on real models of sphere, ellipsoid, cylinder, date nucleus, streamline, triangle and various polygons or regular polygons are performed, and the sphere is selected as the best choice. According to Bernoulli's principle of fluid movement, in addition to being able to float in the direction of the fluid, the drift of the object in the flow field with the change of the flow velocity also generates the lateral thrust due to the flow velocity difference between the two sides of the fluid, so that the object can always automatically float to the fluid with a higher flow velocity in the flow field. Theoretically, streamlined objects are more prone to lateral forces in the water stream, and other elongated objects (ellipsoids, cylinders, date pits, streamlines, various polygons) should be more capable of acquiring lateral forces than isotropic objects (spheres, various polygons). The problem, however, is that if the object is free to drift, the correct direction of drift is maintained while lateral thrust is obtained. In the experiment and computer simulation, it is proved that only isotropic has the feature of moving automatically to the direction of maximum velocity in the flow field in free drift, and finally the sphere is the best choice. Due to the need to install a variety of detection equipment, this embodiment selects the ball-game table shape in selecting the shape of submerged buoy. Through the actual model test and computer simulation, the drifting performance of the ball-game table shape and the ball shape are basically the same, which can also achieve the characteristics of automatic drifting to the main stream, and can avoid stranding or sticking.

A ball-game table generally consists of two end faces: an upper bottom surface, a lower bottom surface, and an outer circular surface; generally, the end surface with the larger diameter is referred to as the lower bottom surface, and the end surface with the smaller diameter is referred to as the upper bottom surface. However, in this embodiment, the ball-game table is placed upside down, the end surface having a larger diameter and above the water surface is on top, and the end surface having a smaller diameter submerged is at the bottom. In order to comply with common practice, the end surface having the larger diameter of the ball-game table is referred to as a lower bottom surface, and the end surface having a smaller diameter is referred to as an upper bottom surface.

In order to solve the problems of collision and impact resistance, this embodiment employs the buoy as a whole, including a ball-game table partially submerged, and the upper facilities are of a flexible inflation structure similar to a rubber scooter.

The ball-game table-shaped body is made of a flexible material that is impermeable to air, forming an inflation structure. As a result of the development of the modern textile industry, there are a large number of very tough cloths having property of being impermeable to air and can be used as the material of the inflation body. The advantage of the inflation element is that it provides good impact relief and protection of equipment compartments which are of a regid structure. In order to prevent the whole from losting inclusion due to the puncture of the inflation member, a double-layer structure may be provided in the inflation body, and an isolation compartment may be provided so that, once a certain place is punctured, there is only a partial leakage, and the whole can be maintained in a fully inflated state.

In order to ensure a sball-game table drift of the buoy, this embodiment provides that the buoy superstructure is a conically arranged connector and a disc-shaped arrangement of stabilizing rods. The connector and stabilizing rods are all inflation structures. The upper layer is provided with a connecting rod and a stabilizing rod in order to prevent the buoy from being obstructed during the drifting process, and a physical size thereof is also carefully selected and cannot be too large or too small. If the integral ball type is used, the profile of the entire buoy is too large to be easily stranded, so that a rod structure is used in this embodiment to control the buoy profile within a certain range.

This embodiment sets the draft of the buoy to ¼ to ⅓ of a height H of the inflation body, as shown in FIG. 1. A counterweight is provided at the bottom of the center of the ball-game table, so that under the combined effect of the weight of the equipment compartment, a larger part of the inflation body floats on the water surface and only a smaller part is submerged because the buoy has a smaller draft to be able to land in shallow water.

The ball-game table floor diameter according to this embodiment is set between 0.5 and 2.5 meters, and the diameter essentially represents the size of the overall shape of the buoy as shown in FIG. 1. A lower limit of the diameter is set to 0.5 m because the buoy as a whole is too small to be easily caught by aquatic plants such as weeds or reed, but not too large to be meaningful. The size of this dimension depends mainly on the terrain environment and ecological environment of a measured river. If the flow is turbulent, the terrain is complex, there might be many gullies, reefs and bends, the buoy is bigger to avoid being thrown out of a water channel in the gully. Conversely, if the water flow is smooth and the beach is large, the buoy as a whole may be smaller to avoid stranding.

The purpose of the inflation-stabilizing rod is to create a roly-poly effect in cooperation with the center of the buoy when elevating the center of mass. At the same time, the inflation-stabilizing rod is also rectangular to prevent rolling action. When the buoy is tipped over, as shown in FIG. 4, the inflation body and inflation-stabilizing rod are supported on the ground, which can be turned over with a slight disturbance. The inflation-stabilizing rods are radial, not too few or too many (4 inflation-stabilizing rods are as shown in FIG. 1). If there are too less inflation-stabilizing rods, the outer edge envelope support effect is not obvious, making the buoy difficult to be turned up after being tipped over. If there are too many inflation-stabilizing rods, the envelope of the outer edge is close to circular, lateral rolling easily takes place. According to the experiment, four inflation-stabilizing rods are the best.

The inflation connectors are distributed in a conical shape, i.e: the connectors are all tilted. The tilted arrangement has the advantage of reducing impact and damage. Since once the connecting rods are damaged, the entire buoy body is destroyed, and the functions of collision prevention and stranding avoidance are strongly weakened or even eliminated; although more connecting rods may be provided, costs will be increased. The smaller the number of inflation connectors, the better, and the use of two inflation connectors is shown in FIGS. 1 and 2, which is the minimum requirement for the number of connectors, and if three or four connectors are added, the overall reliability can be enhanced.

Both the inflation-stabilizing rod and the root inflation connector can be provided in a double layer structure and a compartment structure to increase their reliability.

Figure 5:
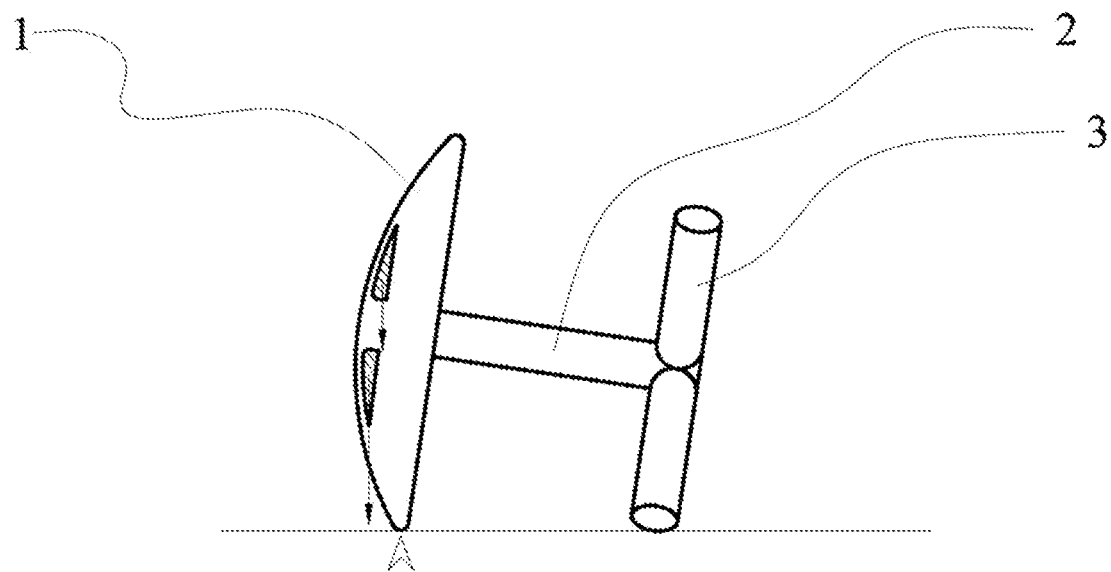
FIG. 5 is a schematic diagram showing a state in which a buoy according to an embodiment of the present invention is turned over.

In order for the buoy to be able to drift stably and to be able to tip up autonomously after an accidental tip over, this embodiment employs a special arrangement: a plurality of counterweights capable of mutual displacement are provided on the bottom edge of the ball-game table-shaped main body, and these counterweights are laid flat on the upper bottom surface of the ball-game table, and are not fixedly connected to each other, but are connected via a flexible inflation outer bag, and since the inflation outer bag is flexible, a certain displacement can be generated between each piece of counterweights, and although this mutual displacement is not large, which is generally only one or two centimeters, it has a large effect, so that the buoy that is tipped over can independently turned right under a small water flow impact, as shown in FIG. 5. In FIG. 5, the center of each counterweight is outside a supporting point (triangular arrow in FIG. 5) (only two pieces are as shown in FIG. 5, but can fully represent the position of the center of gravity of each other weight), so that the buoy which is tipped over is in an unstable state, and at the same time, since each weight is flexibly connected and can be displaced from each other, the buoy can be independently tipped over when there is wind or water flow impact, or any external force. The experimental results show that when the counterweight is divided into a number of flexible connections, the probability of the buoy turning right is greatly increased.

This embodiment may function as an electronic buoy carrying radio beacons, or as a passive buoy to a laser reflecting plate, relying only on a reflected laser diastimeter for water flow measurements. If the electronic equipment is installed, a hard material equipment compartment can be provided in the center of the inflation body, and electronic devices such as communication and positioning and auxiliary facilities such as batteries can be installed in the compartment. The equipment compartment profile may be designed as a body of revolution, such as cylindrical, or spherical, etc.

Embodiment 2

This embodiment is an improvement of the first embodiment and is a refinement of the first embodiment regarding the inflation body, the inflation connector, and the inflation-stabilizing rods. The inflation body, the inflation connector and the inflation-stabilizing rods described in this embodiment are of a double-layer structure.

The use of a double layer structure for better protection, i.e., adding a layer of protection within the outer layer and separating air chambers of the outer and inner layers, and if the outer layer breaks, the inner layer can continue to retain its original shape, is particularly important for buoys operating in depopulated areas.

Embodiment 3

This embodiment is an improvement of the above-mentioned embodiment, and is a refinement of the above-mentioned embodiment regarding the inflation body, the inflation connector, and the inflation-stabilizing rods. The inflation body, the inflation connector and the inflation-stabilizing rods described in this embodiment are provided with inflation compartments.

The inflation compartment can be provided in sections, i.e., the inflation body is divided in the circumferential direction, and the connector and the stabilizing rods are long rod-shaped, and can be divided into compartments along the long direction, and can also be provided with cross-line partitions along the length direction to separate the parts which are easy to be damaged from the parts which are not easy to be damaged, thereby improving the viability.

Embodiment IV

This embodiment is an improvement of the above-described embodiment in that the above-described embodiment relates to a refinement of the ball-game table-shaped inflation body which is a ball-game table of ⅛ to ⅙ balls.

Figure 6:
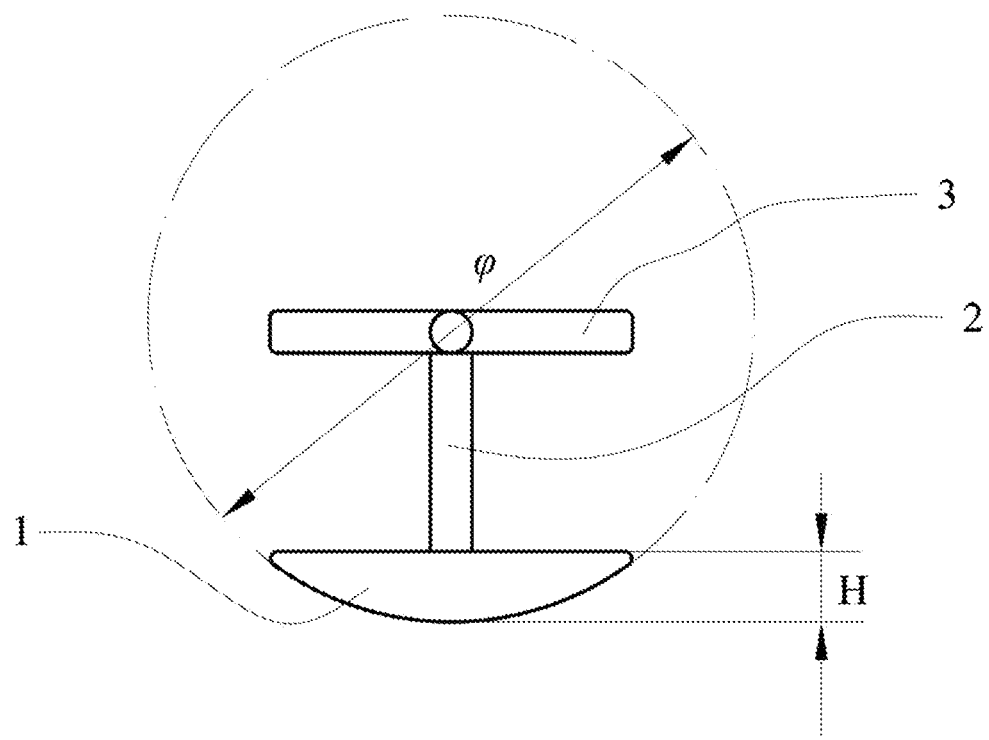
FIG. 6 is a size calculation diagram of showing a ball-game table according to a fourth embodiment of the present invention.

If the spherical diameter of the ball-game table is φ, then H=(⅛-⅙)φ, as shown in FIG. 6.

Example 5

This embodiment is an improvement of the above-described embodiment, and is a refinement of the above-described embodiment regarding the inflation body, in which the center of the inflation body is provided with an equipment compartment made of a hard material.

ABS engineering plastics may be used for the equipment compartment. Such engineering plastics have high structural strength, good sealability and corrosion resistance.

Example 6

This embodiment is an improvement of the above-mentioned embodiment, and is a refinement of the above-mentioned embodiment regarding an equipment compartment which is spherical.

Due to the isotropic and non-angular characteristics, the spherical shaped article has strong anti-collision ability and is the best choice for the shape of equipment compartment. The smaller diameter spherical equipment compartment can be sealed by welding, and the larger diameter spherical equipment compartment can be sealed by screws plus sealing rings.

Example 7

This embodiment is an improvement of the above-mentioned embodiment and is a refinement of the above-mentioned embodiment regarding an equipment compartment, and the equipment compartment described in this embodiment is provided with a satellite positioning module, a radio communication module, and a power supply module.

The equipment compartment is composed of a power supply system and a positioning communication module, including BDS or GPS satellite positioning communication module and corresponding communication antenna. The power supply system can be controlled by a magnetic switch, and the battery can be a lithium thionyl chloride high-energy battery, and the working voltage is sball-game table. The equipment compartment is located at the bottom of the buoy, and the weight and counterweight are balanced to ensure the proper draft of the buoy to ensure the stability of the buoy in the impact flow.

Finally, it should be pointed out that while the present invention has been described in detail with reference to preferred arrangements thereof, it should be understood by a person skilled in the art that various changes may be made and equivalents may be substituted for elements thereof without departing from the spirit and scope of the present invention.

We claim:

1. A water flow measuring drifting buoy capable of preventing stranding and resisting impact, comprising: an isotropic truncated ball-shaped inflation body with a counterweight, wherein the isotropic truncated ball-shaped inflation body is composed of a lower bottom surface with a larger diameter, an upper bottom surface with a smaller diameter, and an outer circular surface, and when the water flow measuring drifting buoy is at a normal position for water flow measuring, the lower bottom surface is located above and the upper bottom surface is located below, wherein the isotropic truncated ball-shaped inflation body is provided with at least two inflation connectors, and the inflation connectors are of a cross-shaped structure formed by connecting in a conical distribution with 3-6 inflation-stabilizing rods uniformly distributed along a circumferential radiation, and an envelope diameter of an outer edge of the inflation-stabilizing rods is greater than or equal to a rotating diameter of the isotropic truncated ball-shaped inflation body; the counterweight comprises 4-10 fan-shaped steel plates arranged annularly around a center of the upper bottom surface of the isotropic truncated ball-shaped inflation body, and the fan-shaped steel plates are flexibly connected to each other to be able to shake;

in order for the buoy to be able to drift stably and to be able to tip up automatically after an accidental tip over, the fan-shaped steel plates are laid flat on the upper bottom surface of the isotropic truncated ball-shaped inflation body, wherein the fan-shaped steel plates are not fixedly connected to each other, but are connected via a flexible inflation outer bag and, since the flexible inflation outer bag is flexible, a displacement of one to two centimeters can be generated between the fan-shaped steel plates, this displacement has an effect, such that the water flow measuring drifting buoy that is accidentally tipped over will be automatically turned to the normal position under a water flow impact, gravity center of each of the fan-shaped steel plates is located outside a supporting point of the isotropic truncated ball-shaped inflation body when an accidental tip over occurs, so that the water flow measuring drifting buoy which is accidentally tipped over is in an unstable state, and at the same time, since the fan-shaped steel plates are flexibly connected to each other and displace relative to each other, the water flow measuring drifting buoy will be automatically tipped over to the normal position when there is an external force present;

wherein the diameter of the lower bottom surface of the isotropic truncated ball-shaped inflation body is in the range of 0.5 to 1.8 meters;

wherein the counterweight maintains ¼ to ⅓ of the isotropic truncated ball-shaped inflation body immerged in water while floating; and wherein the isotropic truncated ball-shaped inflation body is a truncated ball of ⅛ to ⅕ of the ball.

2. The drifting buoy according to claim 1, wherein the isotropic truncated ball-shaped inflation body, the inflation connectors and the inflation-stabilizing rods are of an inner-outer double-layer structure.

3. The drifting buoy according to claim 2, wherein the isotropic truncated ball-shaped inflation body, the inflation connectors and the inflation-stabilizing rods are provided with an inflation compartment.

4. The drifting buoy according to claim 1, wherein the isotropic truncated ball-shaped inflation body is provided with an equipment compartment made of hard material at a center portion thereof.

5. The drifting buoy according to claim 4, wherein the equipment compartment is of a spherical shape.

6. The drifting buoy according to claim 5, wherein a satellite positioning module, a radio communication module and a power supply module are provided in the equipment compartment.

* * * * *